Apr. 10, 1923. Re. 15,574

J. C. DUNHAM

WEATHER STRIP

Original Filed July 12, 1920

INVENTOR
Joseph C. Dunham
BY Arthur C. Brown
ATTORNEY

Reissued Apr. 10, 1923. Re. 15,574

UNITED STATES PATENT OFFICE.

JOSEPH C. DUNHAM, OF OKLAHOMA, OKLAHOMA.

WEATHER STRIP

Original No. 1,416,698, dated May 23, 1922, Serial No. 395,537, filed July 12, 1920. Application for reissue filed January 22, 1923. Serial No. 614,320.

*To all whom it may concern:*

Be it known that I, JOSEPH C. DUNHAM, a citizen of the United States, and a resident of Oklahoma, Oklahoma County, Oklahoma, have invented certain new and useful Improvements in Weather Strips, of which the following is a specification.

This invention relates to weather strips of that general character in which a resilient sheet metal strip is employed and adapted to be interposed between the edge of the door and the jamb and adapted to be tensioned by the closing of the door.

The object of the invention is to provide means to prevent passage of air between a door and jamb.

Referring to the accompanying drawings, in which.

Figure 1:
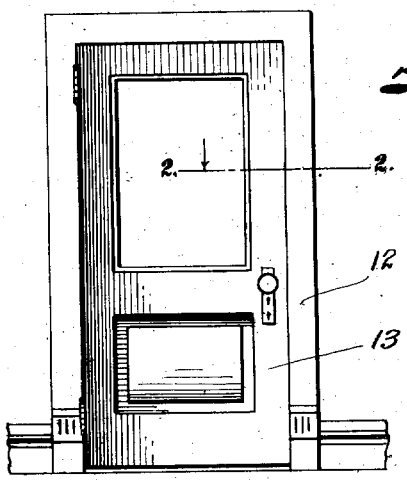
Fig. 1 is an elevation view of a door and door frame on which the improved weather-strip is installed.
Figure 2:
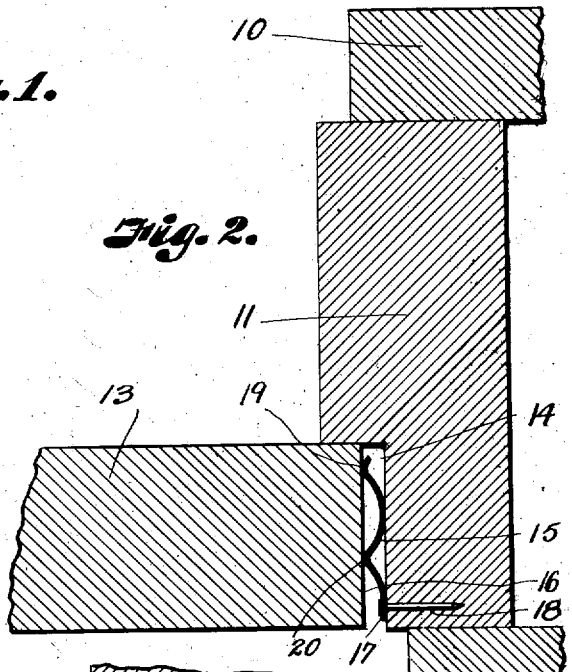
Fig. 2 is an enlarged sectional view taken on the line 2—2 of Fig. 1.
Figure 3:
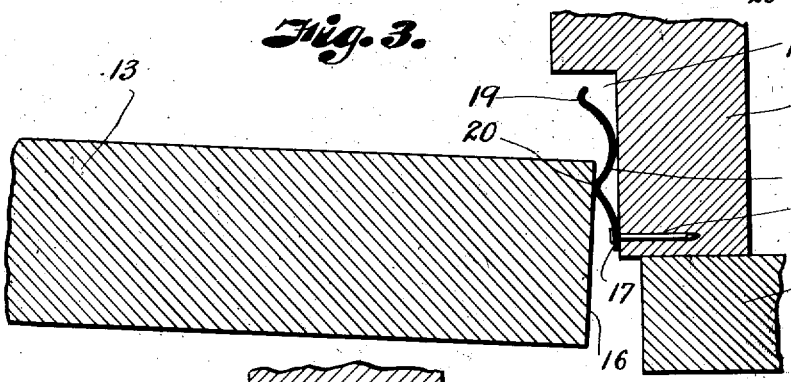
Fig. 3 is a reproduction of a portion of Fig. 2, but with the door slightly open.
Figure 4:
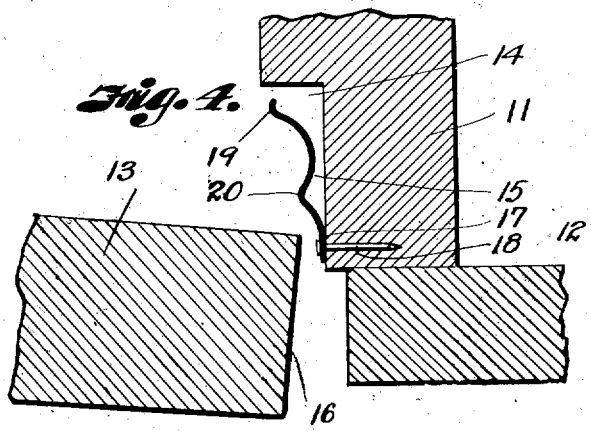
Fig. 4 is a reproduction of the same portion of Fig. 2, with the door a little further open.

In Figs. 2 to 4 the weather-strip is shaded in solid black and is shown of exaggerated thickness.

Like characters of reference designte like parts in all the figures.

The door and frame shown in this instance include the outer casing 10, the jamb 11, the inner casing 12, and the door 13; the jamb being rabbeted as at 14 to receive the door.

The improved weather-strip 15, hereinafter referred to as the strip, is of sheet metal, for example sheet brass of good spring quality.

Figure 5:
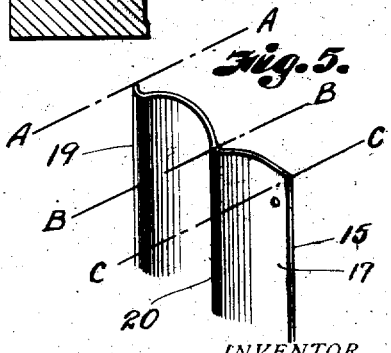
Fig. 5 is a perspective view of a small portion of the improved weather-strip.

In cross-section, that portion of the strip between the lines A—A and B—B (Fig. 5) is shaped as an arc of a circle and adapted to have its edges bear against the edge 16 of the door 13; the round back surface of the strip resting against the jamb 11 in the rabbet 14.

The remaining portion of the cross-section of the strip between the lines B—B and C—C is also shaped as an arc of a circle, with a portion 17 adapted to be fastened to the jamb 11 by nails 18.

The centers of curvature of both the curved sections of the strip are both on the same side of the strip. It will be noted that one curve ends at one edge of a peak 19, while the meeting ends of both curves also end in a common peak 20.

By reference to the drawings it will be observed that the peaks 19 and 20 constitute longitudinal sealing corrugations intermediate the side edges of the strip and that the corrugations are parallel so that they can abut against one of the members, usually the movable member, to effectually seal the space between the movable member, for example, the door 13 and the jamb 11. Therefore, the metal weather strip consists of a concavo-conxex strip in cross section, having one edge for attachment to a support and the other freely movable, the concavo-convex strip having longitudinal sealing corrugations, one of which is intermediate the side edges of the strip, the other corrugation being in the form of a lip or curved portion. The peaks or corrugations 19 and 20 constitute line contacts with the member against which they abut, thereby providing an effectual seal.

Since the strip is fastened at one end and is of inherent spring metal, it is obvious that the free end will tend to spring out when pressure is not applied but that it will swing back or fulcrum on the part to which it is secured so that it can be put under tension when functioning as a seal. Therefore, the line contacts will bear against one of the members to be sealed with enough force to prevent leakage of air between the parts to be sealed.

In closing the door 13, the strip 15, held at its outer edge by the nails 18, is wholly or partially straightened out in cross section, thereby placing said strip under tension and forming it into a packing between the door and jamb.

The improved strip may be used between the meeting rails of two sashes, or in any place where the surfaces of two relatively movable parts meet each other with a sliding contact or movement.

Spring brass eight-thousandths of an inch thick is found to be suitable for the strip.

The following is claimed:

1. A compound-curved sheet metal weather strip formed in cross section into two arc-shaped portions, the edges of one of which are adapted to bear against the edge of a door with the curved back of said portion bearing against the jamb in the rabbet thereof, the other portion being provided with an end portion for fastening to the jamb, the centers of curvatures of both arc-shaped portions being on the same side of the strip and the peaks of both curves engageable with the edge of a door to be placed under tension at separated points.

2. In a closure structure comprising a frame and a movable closure member, a resilient weather strip normally disposed between the face of one of the jambs of said frame and the normally adjacent edge face of said member, said strip comprising a plurality of arcs struck from points on the same side of the strip, and terminating in a securing edge for attachment to one of said faces and in a lip at the opposite edge of said strip, the adjacent portions of the respective arcs uniting to form a peak separating said arcs, said strip, when said closure member is in closed relation to the jamb, being cramped betwen said faces with the peak and lip in weather-excluding engagement with one, and the rear portions of the arcs in engagement with the other of said faces.

In testimony whereof I affix my signature.

JOSEPH C. DUNHAM.